US008645468B2

(12) United States Patent
O'Sullivan et al.

(10) Patent No.: US 8,645,468 B2
(45) Date of Patent: Feb. 4, 2014

(54) COLLABORATIVE ARBITRATION OF POLLING RESULTS IN A COLLABORATIVE COMPUTING ENVIRONMENT

(75) Inventors: Patrick O'Sullivan, Dublin (IE); Cynthia E. Barber-Mingo, Westford, MA (US); Gary Denner, Dublin (IE); Ruthie D. Lyle, Durham, NC (US); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 1499 days.

(21) Appl. No.: 11/557,583

(22) Filed: Nov. 8, 2006

(65) Prior Publication Data

US 2008/0126488 A1    May 29, 2008

(51) Int. Cl.
*G06F 15/16* (2006.01)
*G06F 17/00* (2006.01)
*G06F 7/00* (2006.01)

(52) U.S. Cl.
USPC ........... 709/205; 709/206; 707/601; 707/602; 707/603; 707/604; 707/610

(58) Field of Classification Search
USPC .................................. 709/204, 205, 206, 207
See application file for complete search history.

(56) References Cited

U.S. PATENT DOCUMENTS

| 6,980,983 | B2 | 12/2005 | Banerjee et al. | |
|---|---|---|---|---|
| 2002/0138582 | A1* | 9/2002 | Chandra et al. | 709/206 |
| 2003/0033302 | A1* | 2/2003 | Banerjee et al. | 707/6 |
| 2003/0182177 | A1* | 9/2003 | Gallagher et al. | 705/10 |

FOREIGN PATENT DOCUMENTS

WO    WO 03091889 A1 * 11/2003

OTHER PUBLICATIONS

Don Paulsen; Leadership Essentials: Facilitation Skills for Improving Group Effectiveness; 2004; ACM; 10-13; 153-160.*
Xiu, Meng et al; Research on Technologies of Conflict Arbitration Based on Fuzzy Evaluation in Collaborative Design, AN-8543979; Computer Integrated Manufacturing Systems, vol. 11, No. 3, pp. 399-404, Mar. 2005.

(Continued)

*Primary Examiner* — Evans Desrosiers
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to arbitrating polling results and provide a novel and non-obvious method, system and computer program product for collaborative arbitration of polling results in a collaborative environment. In an embodiment of the invention, a method for collaborative arbitration of polling results in a collaborative environment can be provided. The method can include placing a poll within a message and sending the message to a select group of collaborators in the collaborative environment. The method further can include receiving poll results from a collaborator in the select group in a reply to the message, extracting the poll results from the reply and placing the poll within a new message along with the extracted poll results. Thereafter, the new message can be sent to the select group.

17 Claims, 3 Drawing Sheets

(56) References Cited

OTHER PUBLICATIONS

Wu. Qi. et al; Arbitrator-based Algorithm for Measurement Collaboration Problem, IEEE, Proceedings 2003 Int'l Conference on Computer Networks and Mobile Computing. ICCNMC 2003, Shaghai, China.

Dew, Peter, at al; Virtual Artefacts to Support Negotiation within an Augmented Collaborative Environment for Alternate Dispute Resolution; CVE'02, Sep. 30-Pctober 2, 2002, Bonn, Germany.

Robinson, William N., et al; Requirements Interaction Management; ACM Computing Surveys, vol. 35, No. 2, Jun. 2003, pp. 132-190.

* cited by examiner

| Calendaring & Scheduling [Collaborative Arbitration - Poll] | X |

Subject: [ 310 ]    Moderator: [ 320 ]

Collaborative Arbitration  
Voting Content 350  
☐ Information Collection  
☒ Selection Information Respond By: [ 330 ]

Voters: 360  
Required: [ ]  
Optional: [ ]  
FYI: [ ]

Description: [ 340 ]

Polling Data 370  
☐ Choice 1  
☐ Choice 2  
☐ Choice N

Aggregated Results 380

| | Voter 1 | Voter 2 | ... | Voter N |
|---|---|---|---|---|
| Choice 1 | X | | | |
| Choice 2 | | X | | |
| Choice N | | X | | |

COLLABORATIVE ARBITRATION OF POLLING RESULTS IN A COLLABORATIVE COMPUTING ENVIRONMENT

BACKGROUND OF THE INVENTION

1. Field of the Invention

The present invention relates to collaborative computing and more particularly to collaborator polling in a collaborative computing environment.

2. Description of the Related Art

Collaborative computing refers to the use by two or more end users of a computing application in order to achieve a common goal. Initially envisioned as a document sharing technology among members of a small workgroup in the corporate environment, collaborative computing has grown today to include a wide variety of technologies arranged strategically to facilitate collaboration among members of a workgroup. No longer merely restricted to document sharing, the modern collaborative environment can include document libraries, chat rooms, video conferencing, application sharing, and discussion forums to name only a few.

A collaborative computing application enjoys substantial advantages over a more conventional, individualized computing application. Specifically, at present it is rare that a goal of any importance is entrusted and reliant upon a single person. In fact, most goals and objectives can be achieved only through the participation of a multiplicity of individuals, each serving a specified role or roles in the process. Consequently, to provide computing tools designed for use only by one of the individuals in the process can be short sighted and can ignore important potential contributions lying among the other individuals involved in the process.

Personal information managers, project management systems and workflow management systems represent three such computing applications which attempt to manage a process leading to an objective, leveraging of the participation of many individuals in the process. Calendaring systems have formed the core component of personal information management software and firmware applications for decades. Initially, a mere calendar display, modern calendaring systems provide scheduling and alarm functions in addition to full integration with contact management, time entry, billing and project management applications. The typical calendaring application minimally provides a mechanism for scheduling an event to occur on a certain date at a certain time.

Several software products include support for Calendaring & Scheduling (C&S). Known C&S products include Lotus™ Notes™, Microsoft™ Outlook™, and web-based products like Yahoo!™ Calendar™. These products allow one to manage personal events including appointments and anniversaries. C&S products also typically allow one to manage shared events, referred to generally as meetings. Electronic Calendaring and Scheduling software allows a group of people to negotiate around the scheduling of a proposed event such as a meeting, with the goal of selecting a time that allows most of the group to attend.

Negotiating the scheduling of a meeting in a C&S system represents a species of the larger collaborative task of negotiating a result to a poll. In the former instance, the poll is the specific case of proposing a meeting time. In the broader context, a poll can be a proposition soliciting a selection or information in general from a designated group of collaborators. Presently, managing responses to a poll entails the use of a single, shared document passed from collaborator to collaborator. As each collaborator "votes", the aggregation of votes can be persisted to the single, shared document and other collaborators can be permitted access to the document. Other solutions include the use of customized applications which can be time consuming to produce and manage.

Collaborator non-responsiveness remains a central problem identified within the collaborative environment. Specifically, though the collaborative environment provides a substantial tool to facilitate collaboration, in the end, the success or failure of collaboration turns on the willingness of collaborators to participate in a timely fashion. As applied to polling, the ability to arbitrate a poll results depends heavily upon the initiative of polled collaborators to locate the shared document and provide proposed results. To the extent that a collaborator engages the shared document only once, the polling results will represent an aggregation of static choices absent dynamic changes in preferences owing to the polling results of other collaborators.

BRIEF SUMMARY OF THE INVENTION

Embodiments of the present invention address deficiencies of the art in respect to arbitrating polling results and provide a novel and non-obvious method, system and computer program product for collaborative arbitration of polling results in a collaborative environment. In an embodiment of the invention, a method for collaborative arbitration of polling results in a collaborative environment can be provided. The method can include placing a poll within a message and sending the message to a select group of collaborators in the collaborative environment. The method further can include receiving poll results from a collaborator in the select group in a reply to the message, extracting the poll results from the reply and placing the poll within a new message along with the extracted poll results. Thereafter, the new message can be sent to the select group.

The method additionally can include receiving additional poll results from another collaborator in the select group in a reply to the new message and extracting the additional poll results from the reply to the new message. Subsequently, the additional poll results can be aggregated with existing poll results for the poll to produce an aggregated set of poll results. As such, the poll can be placed within an even newer message along with the aggregated set of poll results. Thereafter, the even newer message can be sent to the select group.

In one aspect of the embodiment, the poll can discontinue once a threshold period of time has elapsed. In another aspect of the embodiment, the poll can discontinue once poll results have been received from a threshold number of collaborators in the select group. In either circumstance, once the poll has terminated, all poll results can be forwarded to a designated moderator in the message.

In another embodiment of the invention, a collaborative computing data processing system configured for collaborative arbitration can be provided. The system can include a collaborative computing host coupled to one or more collaborative computing clients over a computer communications network. The system also can include a mail server coupled to the collaborative computing host and a set of mail clients, each coupled to a corresponding one of the collaborative computing clients. Finally, the system can include a collaborative arbitration module coupled to the collaborative computing host.

The collaborative arbitration module can include program code enabled to place a poll within a message and to send the message via the mail server to a select group of collaborators. The program code can be further enabled to receive poll results from collaborators in the select group in respectively different replies to the message, to extract poll results from the different replies, to repeatedly place the poll within new messages along with an aggregation of the extracted poll results, to send the new messages to the select group. Thereafter, the program code can be even yet further enabled to terminate the poll and to provide the poll results to a moderator designated in the message.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for collaborative arbitration of polling results in a collaborative environment. In accordance with an embodiment of the present invention, a polling question can be encapsulated in a message and concurrently transmitted to a selected group of collaborators. Whenever a polling result is received from a collaborator, a new message can be composed including both the polling question and an aggregation of polling results thus far received from the collaborators. The new message can be transmitted to the selected group of the collaborators and new results can be collected. In this way, a view to dynamic changes in the polling results can be pushed to the collaborators in a proactive way to encourage responses to the polling question.

Figure 1:
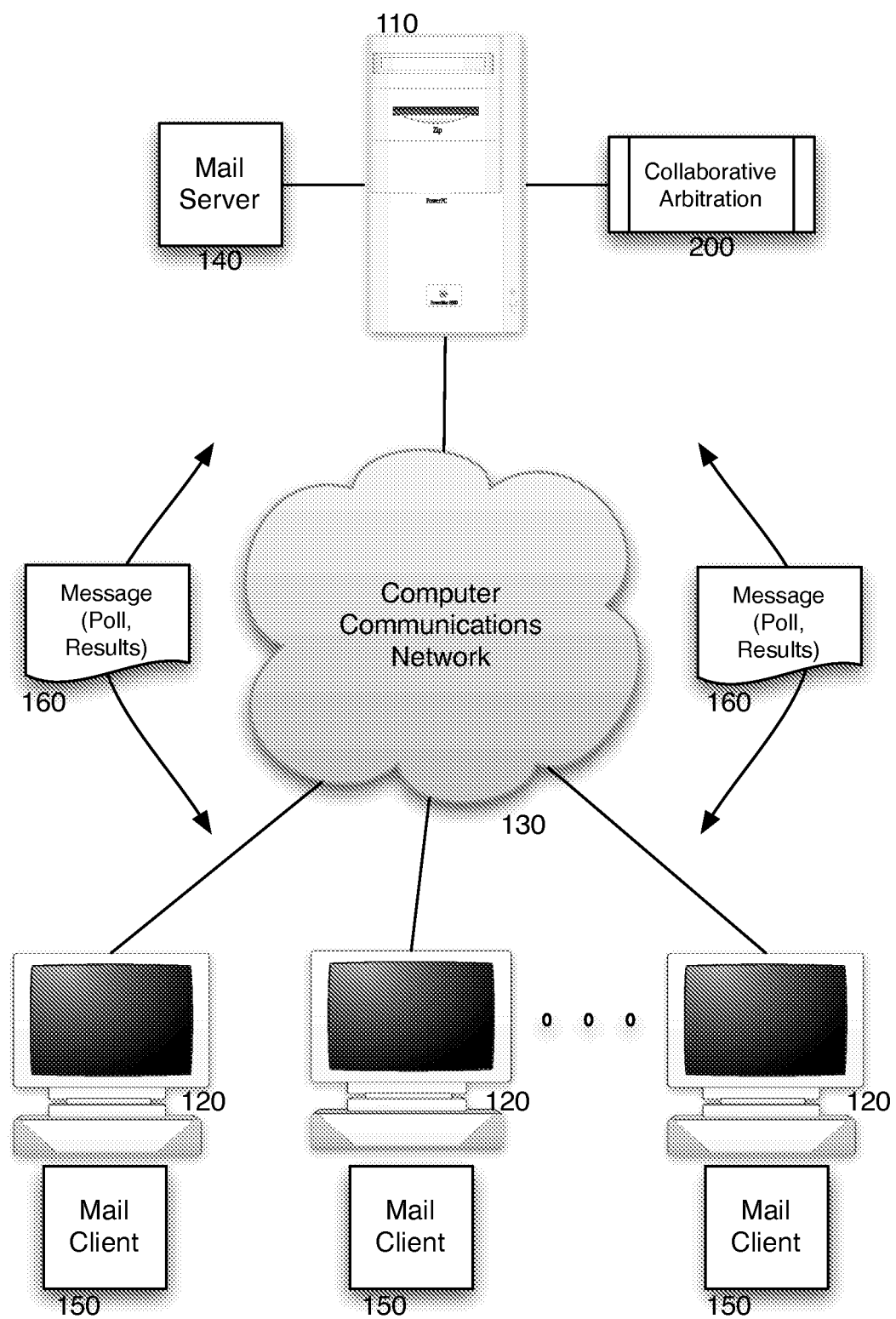
FIG. 1 is a schematic illustration of a collaborative data processing system configured for collaborative arbitration of polling results.

In further illustration, FIG. 1 is a schematic illustration of a collaborative data processing system configured for collaborative arbitration of polling results. The system can include a C&S server 110 providing calendaring and scheduling functionality for communicatively coupled collaborative clients 120 over a computer communications network 130. The C&S server 110 can include a mail server 140 configured for managing the delivery of messages to the collaborative clients 120 over the computer communications network 130. Each of the collaborative clients 120 in turn can include a mail client 150 configured to facilitate the composition, transmission, receipt and viewing of messages through the mail server 140.

Notably, a collaborative arbitration module 200 can be coupled to the C&S system 110. The collaborative arbitration module 200 can include program code enabled to compose a poll within a message 160. The message 160 can be routed to voters among the clients 120 and replies to the message 160 can be processed within the collaborative arbitration module 200 to identify poll results. The poll results, in turn, can be aggregated within the message 160 and re-sent to the voters. The process can continue as determined by the logic of the collaborative arbitration module 200. For instance, the different voters can be time limited in providing poll results as requested by the message 160, or the poll can terminate upon receiving a threshold number of votes.

In consequence, each of the voters can enjoy a view to dynamic voting so long as the poll remains active. Additionally, each of the voters can be expressly invited to participate in the poll through the receipt of a message in the C&S system encapsulating the poll, rather than relying upon the voter proactively seeking out a static, shared document. Finally, it is to be recognized that the voters can be polled asynchronously as opposed to synchronously in order to accommodate the geographic dispersion of collaborators in a collaborative environment. In all instances, the operation of the collaborative arbitration can be applied from the most basic poll—establishing a time for a meeting amongst a group of collaborators, to the most complex poll—receiving unstructured, free form information from a group of collaborators.

Figure 2:
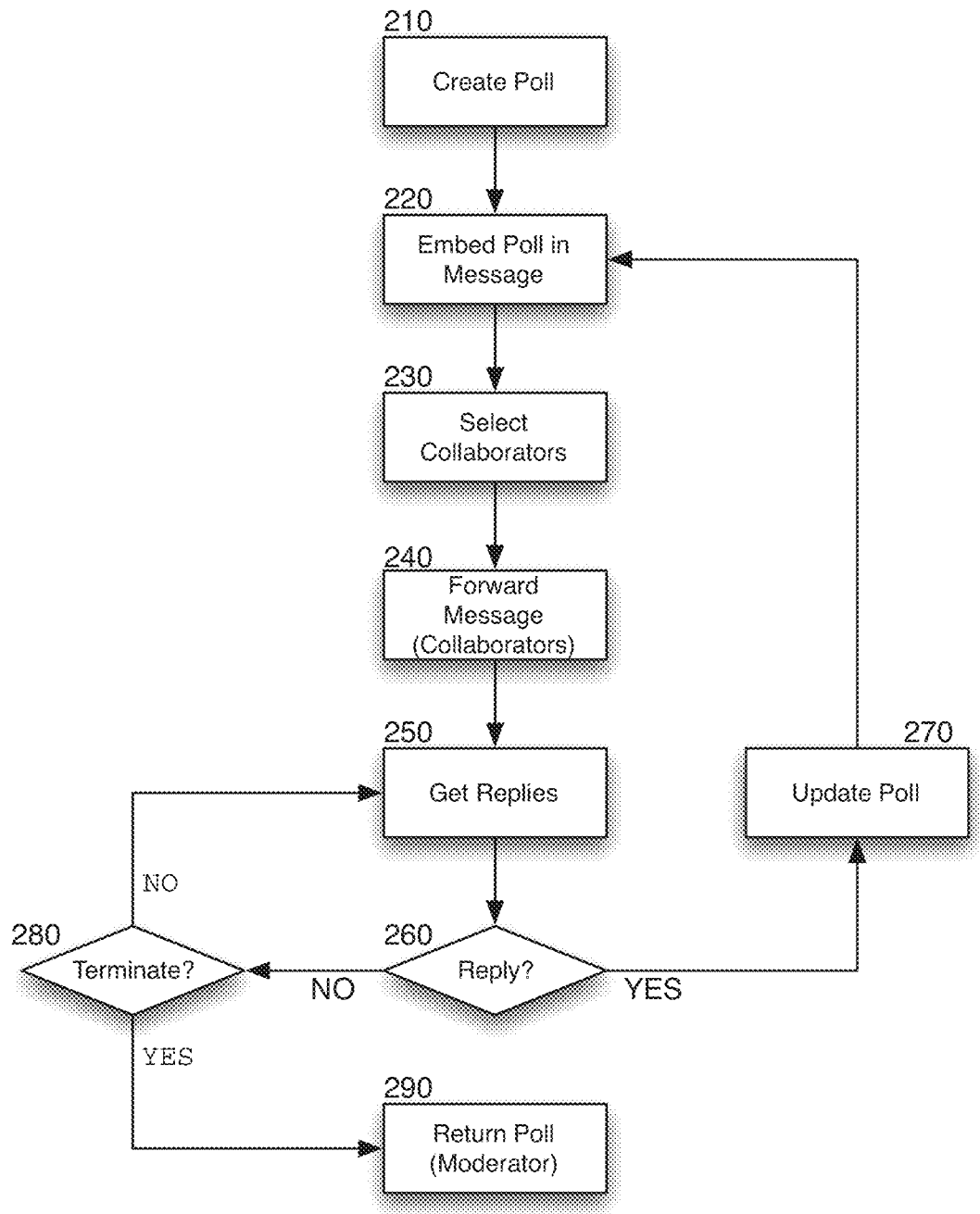
FIG. 2 is a flow chart illustrating a process for collaborative arbitration of polling results in a collaborative environment; and, FIG. 3 is a screen shot of an exemplary user interface for a C&S system configured for collaborative arbitration of polling results.

In yet further illustration, FIG. 2 is a flow chart illustrating a process for collaborative arbitration of polling results in a collaborative environment. Beginning in block 210, a poll can be created for voting by a number of collaborators in the collaborative environment. In block 220, the poll can be embedded in a message such as an e-mail. Concurrently, in block 230 the collaborators selected for voting can be designated to receive the message. Thereafter, in block 240 the message can be forwarded to the designated collaborators for voting.

In block 250, one or more replies can be received to the message from one or more of the collaborators. In decision block 260, if a reply is received from a collaborator, in block 270, the poll results within the reply can be extracted and aggregated with the poll results from the other collaborators. Subsequently, in block 220 the updated poll results can be embedded in another message and the process can repeat through block 230. In this way, the collaborators can receive an iteratively more robust view of the poll results allowing for the collaborators to provide a more informed first-time vote, or a more informed updated vote.

In decision block 260, when replies are no longer detected, in decision block 280, it can be determined whether or not to terminate the poll and provide a final tally of the poll results to the moderator. The poll can be terminated for any number of reasons including a pre-set limit on the duration of the poll, or a pre-determined threshold of votes received from the designated collaborators. If in decision block 280 it is determined not to terminate the poll, the process can return to block 250 during which additional replies to the poll can be received. Otherwise, the poll can terminate in block 290 and the aggregated poll results from the designated collaborators can be returned to the moderator.

Importantly, a user interface can be provided for the collaborative arbitration within a C&S system. To that end, FIG. 3 is a screen shot of an exemplary user interface for a C&S system configured for collaborative arbitration of polling results. As shown in FIG. 3, the C&S collaborative arbitration interface 300 can include an appearance similar to that of a message composition interface common in an e-mail client.

The interface 300 can include, for example, a subject field 310 along with one or more user identity fields 360 designating a recipient for the message. The identity fields 360, however, can indicate not only the recipients of the message, but also those whose votes are required, those whose votes are merely optional, and those whose votes are not solicited.

The interface 300 also can include a moderator field 320 indicating a moderator for a poll encapsulated within the message. Likewise, a description field 340 can be provided for describing the nature of the poll encapsulated within the message. notably, voting content area 350 provides one or more selections indicating whether the poll is intended to collect information in free-form, or whether the poll will provide a set of pre-determined entries amongst which voters are limited in selection. Finally, a poll limitation field 330 can limit the duration of the poll, either in terms of time, or a threshold receipt of poll results.

The interface 300 yet further can include a polling data area 370 into which poll results can be received, either in free-form, or according to a predetermined set of selections. The skilled artisan will recognize that the predetermined set of selections can include not only selectable entries such as those presented through checkbox controls and radio button controls, but also those presented through drop down boxes and static text selection controls. In any event, an aggregated results area 380 also can be provided in the interface 300 into which a view to an aggregation of poll results for the poll can be provided. The aggregated results area 380 can provide a detailed view to the aggregation of poll results while also revealing the specific votes of individual collaborators, or the aggregated results area 380 can provide only a view of the aggregation of poll results without revealing the individual votes of any one collaborator. In both circumstances, though, the aggregated view can provide a benefit of knowledge to designated voters.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for collaborative arbitration of polling results in a collaborative environment, the method comprising:
providing a user interface configured to create a message for placing a poll within the message for use within a calendaring and scheduling (C&S) server providing calendaring and scheduling functionality for communicatively coupled collaborative clients over a computer communications network, the user interface displaying an identity field designating a recipient for the message, a moderator field indicating a moderator for the poll encapsulated within the message, a poll limitation field configured to limit a duration of the poll, a polling data area configured to receive poll results, and an aggregated results area configured to provide an aggregation of poll results;
sending the message over the computer communications network to respective ones of the collaborative clients for a select group of collaborators in the collaborative environment;
receiving poll results in the C&S server from a collaborator in the select group of collaborators in a reply to the message;
extracting the poll results from the reply and placing the poll within a new message along with the extracted poll results;
sending the new message to the select group of collaborators over the computer communications network;
receiving additional poll results from another collaborator in the select group in a reply to the new message;
extracting the additional poll results from the reply to the new message;
aggregating the additional poll results with existing poll results for the poll to produce an aggregated set of poll results;
placing the poll within an even newer message along with the aggregated set of poll results; and,
sending the even newer message to the select group.

2. The method of claim 1, further comprising discontinuing the poll once a threshold period of time has elapsed.

3. The method of claim 1, further comprising discontinuing the poll once poll results have been received from a threshold number of collaborators in the select group.

4. The method of claim 1, further comprising:
terminating the poll; and,
forwarding all poll results to a designated human moderator in the message.

5. The method of claim 1, wherein placing a poll within a message comprises placing a poll within a message to include a discrete selection of pre-established values.

6. The method of claim 1, wherein placing a poll within a message comprises placing a poll within a message to solicit collaborator-provided values in free-form fields.

7. The method of claim 1, wherein sending the message to the select group of collaborators in the collaborative environment further comprises indicating within the message which collaborators in the select group must provide poll results, which are not required to provide poll results, and which are not to provide poll results.

8. A collaborative computing data processing system configured for collaborative arbitration, the system comprising:
   a collaborative computing host coupled to one or more collaborative computing clients over a computer communications network;
   a mail server coupled to the collaborative computing host and a plurality of mail clients, each coupled to a corresponding one of the collaborative computing clients; and,
   a collaborative arbitration module coupled to the collaborative computing host, the collaborative arbitration module comprising program code enabled to place a poll within a message, to provide a user interface configured to create a message for placing a poll within the message, the user interface displaying an identity field designating a recipient for the message, a moderator field indicating a moderator for the poll encapsulated within the message, a poll limitation field configured to limit a duration of the poll, a polling data area configured to receive poll results, and an aggregated results area configured to provide an aggregation of poll results, to send the message via the mail server to a select group of collaborators, to receive poll results from collaborators in the select group of collaborators in respectively different replies to the message, to extract poll results from the different replies and to repeatedly place the poll within new messages along with an aggregation of the extracted poll results, to send the new messages to the select group of collaborators, to terminate the poll and to provide the poll results to a human moderator designated in the message.

9. The system of claim 8, wherein the message is an e-mail.

10. The system of claim 8, wherein the poll comprises a solicitation for a meeting time.

11. A computer program product comprising a computer usable device having computer usable program code for collaborative arbitration of polling results in a collaborative environment, the computer program product including:
   computer usable program code for providing a user configured to create a message for placing a poll within the message for use within a calendaring and scheduling (C&S) server providing calendaring and scheduling functionality for communicatively coupled collaborative clients over a computer communications network, the user interface displaying an identity field designating a recipient for the message, a moderator field indicating a moderator for the poll encapsulated within the message, a poll limitation field configured to limit a duration of the poll, a polling data area configured to receive poll results, and an aggregated results area configured to provide an aggregation of poll results;
   computer usable program code for sending the message to a select group of collaborators in the collaborative environment;
   computer usable program code for receiving poll results from a collaborator in the select group of collaborators in a reply to the message;
   computer usable program code for extracting the poll results from the reply and placing the poll within a new message along with the extracted poll results;
   computer usable program code for sending the new message to the select group of collaborators;
   computer usable program code for receiving additional poll results from another collaborator in the select group of collaborators in a reply to the new message;
   computer usable program code for extracting the additional poll results from the reply to the new message;
   computer usable program code for aggregating the additional poll results with existing poll results for the poll to produce an aggregated set of poll results;
   computer usable program code for placing the poll within an even newer message along with the aggregated set of poll results; and,
   computer usable program code for sending the even newer message to the select group of collaborators.

12. The computer program product of claim 11, further comprising computer usable program code for discontinuing the poll once a threshold period of time has elapsed.

13. The computer program product of claim 11, further comprising computer usable program code for discontinuing the poll once poll results have been received from a threshold number of collaborators in the select group of collaborators.

14. The computer program product of claim 11, further comprising:
   computer usable program code for terminating the poll; and,
   computer usable program code for forwarding all poll results to a designated human moderator in the message.

15. The computer program product of claim 11, wherein the computer usable program code for placing the poll within the message comprises computer usable program code for placing a poll within a message to include a discrete selection of pre-established values.

16. The computer program product of claim 11, wherein the computer usable program code for placing the poll within the message comprises computer usable program code for placing a poll within a message to solicit collaborator-provided values in free-form fields.

17. The computer program product of claim 11, wherein the computer usable program code for sending the message to the select group of collaborators in the collaborative environment further comprises computer usable program code for indicating within the message which collaborators in the select group must provide poll results, which are not required to provide poll results, and which are not to provide poll results.

* * * * *